United States Patent [19]

Norton et al.

[11] Patent Number: 4,561,502

[45] Date of Patent: Dec. 31, 1985

[54] OIL RECOVERY PROCESS USING A POLYACRYLAMIDE GEL

[75] Inventors: Charles J. Norton; David O. Falk, both of Denver, Colo.; Alfred D. Hill, Austin, Tex.

[73] Assignee: Marathon Oil Company, Findlay, Ohio

[21] Appl. No.: 560,056

[22] Filed: Dec. 9, 1983

Related U.S. Application Data

[63] Continuation-in-part of Ser. No. 337,640, Jan. 7, 1982, abandoned.

[51] Int. Cl.[4] .......................... E21B 43/16; C09K 3/00
[52] U.S. Cl. .................................... 166/274; 166/273; 252/8.55 D
[58] Field of Search ................. 252/8.55 D; 166/274, 166/275

[56] References Cited

U.S. PATENT DOCUMENTS

| | | | |
|---|---|---|---|
| Re. 29,716 | 8/1978 | Clampitt et al. | 175/65 |
| 3,039,529 | 6/1962 | McKennon | 166/9 |
| 3,421,584 | 1/1969 | Eilers et al. | 166/33 |
| 3,681,215 | 8/1972 | Peterson | 526/303.1 |
| 3,782,467 | 1/1974 | Hessert | 166/261 |
| 3,785,437 | 1/1974 | Clampitt et al. | 166/281 |
| 3,921,733 | 11/1975 | Clampitt | 166/270 |
| 3,926,258 | 12/1975 | Hessert et al. | 166/294 |
| 3,958,638 | 5/1976 | Johnston | 166/294 |
| 4,009,755 | 3/1977 | Sandiford | 166/270 |
| 4,016,086 | 4/1977 | Norton | 166/275 |
| 4,306,045 | 12/1981 | Yoshida | 526/204 |

OTHER PUBLICATIONS

Mac Williams et al., "Water-Soluble Polymers in Petroleum Recovery", in *Water-Soluble Polymers,* Ed. by N. M. Bikales (vol. 2 of Polymer Science & Technology), Plenum Press, N.Y. 1973, pp. 105-126.

Chyi-Gang Huang, M. S. Thesis, "A Study of the Gellation of Polyacrylamides through the Participation of Chromium (III)." 1980 University of Kansas.

*Primary Examiner*—Theodore Morris
*Attorney, Agent, or Firm*—Jack L. Hummel; Rodney F. Brown

[57] ABSTRACT

A polymer gel is formulated by adding a cross-linking agent containing a polyvalent metal cation to an aqueous solution of undried partially hydrolyzed polyacrylamide. The resulting gel is dissolved or suspended in an aqueous medium and injected via a well into a subterranean hydrocarbon-bearing formation to improve oil recovery from the formation.

12 Claims, 2 Drawing Figures

Screen Factor of Dried PHPA Gels
v.
PHPA Concentration

Screen Factor of Dried PHPA Gels
v.
PHPA Concentration

Screen Factor of Undried PHPA Gels
v.
PHPA Concentration

OIL RECOVERY PROCESS USING A POLYACRYLAMIDE GEL

DESCRIPTION

This is a continuation-in-part application of the co-pending U.S. patent application, Ser. No. 337,640, filed Jan. 7, 1982 now abandoned.

TECHNICAL FIELD

This invention relates to a process for improving the recovery of hydrocarbons from a subterranean formation. More particularly, the invention relates to a process whereby a gel is formulated from an undried partially hydrolyzed polyacrylamide and a cross-linking agent. The resulting gel is injected into the formation in an aqueous medium to improve the recovery of hydrocarbons therefrom.

BACKGROUND ART

Preparation of gels from a polyacrylamide and cross-linking agent is known generally in the art. See Chyi-Gang Huang, M.S. Thesis, "A Study of the Gelation of Polyacrylamide Through the Participation of Chromium (III)", 1980, University of Kansas.

Several references teach the use of polyacrylamide gels for oil recovery applications. Polyacrylamide gels are formed by an in situ reaction after injecting the gel components into a subterranean hydrocarbon-bearing formation. In situ formed gels reduce permeability in highly porous regions of the formation thereby facilitating water-flooding and improving hydrocarbon recovery.

U.S. Pat. No. 3,421,584 to Eilers et al injects a gel-forming system comprised of polyacrylamide in particulate form, a cross-linking agent, silicate and a hydrogen ion source such as acid into a formation. The system gels in situ. U.S. Pat. No. 3,785,437 to Clampitt et al sequentially injects alternating aqueous slugs of partially hydrolyzed polyacrylamide and a redox reagent into a subterranean formation. Gelation occurs when the slugs contact and mix in situ. U.S. Pat. No. 3,958,638 to Johnston injects an aqueous solution of partially hydrolyzed polyacrylamide having microencapsulated redox reagent suspended in the solution. As the microcapsules degrade in situ, the redox reagent is released, contacts the polymer, and forms a gel. U.S. Pat. No. 3,782,467 to Hessert generates carbon dioxide from in situ combustion. The carbon dioxide acidifies an injected mixture of polymer and redox reagent to produce a polymer gel in situ. U.S. Pat. No. 3,926,258 to Hessert et al teaches delayed in situ polyacrylamide gelation. Dried polyacrylamide and a reducible cation cross-linking agent are dissolved in a first aqueous solution. A second aqueous solution containing a complexing agent and reducing agent is combined with the first solution. This mixture is injected into the formation where gelation occurs in situ as the complexing agent releases the reducible metal cation.

Polymer gels are also used in drilling fluids as described in U.S. Pat. No. Re. 29,716 to Clampitt. The drilling fluid contains a dilute gel produced from an aqueous solution of partially hydrolyzed polyacrylamide, a reducible metal cation and a reducing agent.

In a non-gelling application, partially hydrolyzed polyacrylamide is a viscosity increasing agent added directly to flooding water as taught by U.S. Pat. No. 3,039,529 to McKennon.

Although partially hydrolyzed polyacrylamide and gels containing the same are used in a number of hydrocarbon production applications described in the above cited art, a process is needed which more effectively utilizes partially hydrolyzed polyacrylamide in hydrocarbon recovery. It is known in the art that gelled polymer can be more effective than ungelled polymer in many subterranean applications. However, in situ gelation processes do not fully exploit the advantages of polymer gels because in situ produced gels are weak and unstable. This is due in large part to insufficient control over the gelation reaction conditions. As such a process is needed whereby a single homogeneous composition can be injected into a subterranean hydrocarbon-bearing formation to significantly improve hydrocarbon recovery from the formation. More specifically a process is needed which maximizes the effectiveness of a polymer gel in hydrocarbon recovery applications, such as face or fracture plugging, permeability reduction or mobility control. The process requires a stable gel which can be produced in a controlled surface environment, yet can be effectively injected into a subterranean formation to perform any of the above noted hydrocarbon recovery-related functions.

DISCLOSURE OF THE INVENTION

According to this invention a polymer gel is formulated by adding a cross-linking agent to an aqueous solution of undried partially hydrolyzed polyacrylamide (PHPA). The cross-linking agent is either a redox reagent containing a reducible polyvalent metal cation and reducing agent or a polyvalent metal cation in its most reduced state.

The gelation reaction takes place in the aqueous polymer solution upon contact between the PHPA and reduced metal cation. The properties of the resulting gel are dependent on a number of reaction parameters including the type and relative amounts of starting materials in the aqueous reaction solution as well as the initial pH of the polymer solution. values of the reaction parameters are predetermined to produce an optimum gel for a given subterranean application.

Subterranean hydrocarbon recovery-related applications of the process include face and fracture plugging, mobility reduction and permeability reduction. The process also has non-oil field applications such as soil stabilization.

The instant invention is an improvement over prior hydrocarbon recovery processes because it utilizes a more effective polymer gel. Unlike the gels used in prior art processes, the gel of this invention is produced from a polymer which has not been dried prior to gelation. The polymer is maintained in an aqueous solution from the time it is produced until it is gelled. A gel produced from an undried polymer has heretofore unrecognized advantages over gels produced from dried polymer in hydrocarbon recovery applications.

Additionally, the process provides a simplified method for deploying the gel in the subterranean formation. The gel is produced at the surface where the gelation reaction is more readily controlled thereby avoiding the difficulties attendant with process control of in situ reactions.

BEST MODE FOR CARRYING OUT THE INVENTION

Figure 1:
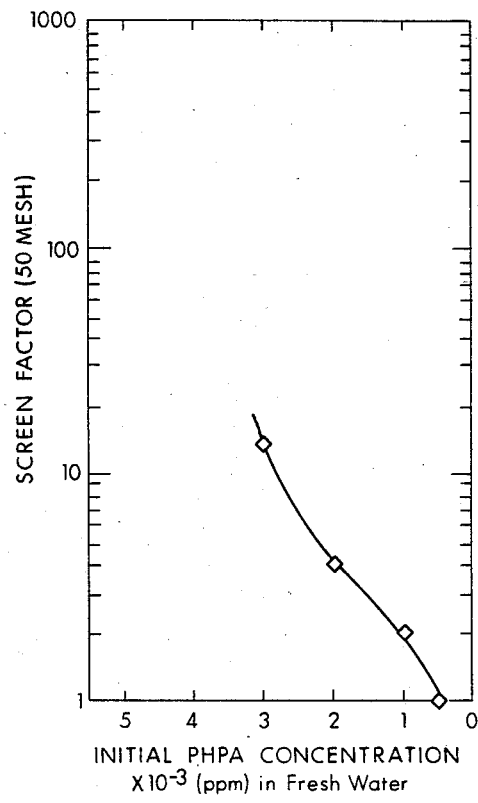
FIG. 1 displays the relation between the screen factor of a dried PHPA gel system as a function of dried PHPA concentration in the system.

The present invention injects a gel, which is either in solution or suspension in an aqueous medium, into a subterranean hydrocarbon-bearing formation to facilitate recovery of the hydrocarbons therefrom. The gel is comprised of a polymer and a cross-linking agent. The polymer is a water-soluble, undried or substantially undried, partially hydrolyzed polyacrylamide (PHPA).

As used herein, the term "undried or substantially undried" refers to the state of the PHPA prior to gelation. When an aqueous monomer solution is polymerized, the polymer product remains in the aqueous reaction medium. Thereafter the polymer can be separated from the aqueous medium and dried. The final polymer product is in an essentially water-free solid particle state. The dried polymer particles can be redissolved in an aqueous medium if one desires to use the polymer in a fluid state. However, in accordance with the present invention, the PHPA is retained in the aqueous medium after it is polymerized without separating and drying it. "Undried or substantially undried" PHPA is an aqueous solution. The pH of the undried PHPA solution is preferably maintained within a range of from about 9 to about 11. The undried PHPA solution is used directly as a starting material for the gelation reaction.

The PHPA can have up to about 75% of the carboxyamide groups hydrolyzed to carboxylate groups. Preferably 25 to 35% of the carboxyamide groups are hydrolyzed to carboxylate groups. The term "hydrolyzed" as used herein encompasses polymers wherein the carboxylate groups are in an acid or salt form such as ammonium salts, alkali metal salts and other salts which are substantially water soluble. The PHPA is water soluble and has a molecular weight of at least 100,000, preferably at least 250,000 and more preferably at least 500,000 up to 10,000,000 or higher. The PHPA concentration in the aqueous medium is within a range of from about 0.1 to about 10% by weight, preferably from about 0.25 to about 5% by weight and more preferably from about 0.25 to about 1% by weight.

The cross-linking agent contains a polyvalent metal cation. The cation can be contained within a redox system, in which case the cation is the oxidizing agent. It is reducible by the reducing agent of the redox system to its lowest valence state. Exemplary oxidizing agents are water-soluble, reducible oxidants such as alkali metal chromates or dichromates (e.g., sodium or potassium dichromate), ammonium chromate or dichromate, or chromium trioxide. The reducing agent is a water-soluble sulfur-containing compound capable of reducing the polyvalent metal cation. Reducing agents include sulfides, sulfites, hydrosulfites and metabisulfites of alkali metals or ammonium. A preferred reducing agent is sodium sulfite. The reducing agent is preferably present in a slight stoichiometric excess to remove dissolved oxygen or other undesirable oxidants from the reaction system.

The cation does not initiate PHPA cross-linking unit it is in its most reduced state. Therefore when a redox system is the cross-linking agent, the gelation reaction is delayed until the cation is reduced.

The preferred cross-linking agent is a water-soluble polyvalent metal cation already in its fully reduced valence state because it effects immediate gelation upon contact with the PHPA. A preferred fully reduced cation is a trivalent chromic ion, which can be present as a salt of chromium such as chromic nitrate.

Values of the gelation process parameters are selected to produce a gel most suitable for a given application. The gel can be produced as either a solid or a liquid. If the gel is a solid, it is milled and dispersed as particles in an aqueous medium forming a suspension. The suspension is injected into the formation to be treated via a well. If the gel is a liquid, it remains dissolved in the aqueous reaction solution and can be injected directly into the formation or it can be further diluted by adding an aqueous medium. The aqueous medium added to the solid or liquid gel can be obtained from the same source as the water used in the prior polymerization reaction or it can be any water ranging in hardness from distilled to brackish. The aqueous medium preferably has the same ion content as the originally polymerized monomer solution and contains no dissolved oxygen. Ungelled PHPA can also be added to the gelled mixture at this time.

Applications of the resulting gel mixture include face or fracture plugging, mobility control or permeability reduction. Gels produced from polymers having a lower molecular weight, i.e., from about 500,000 to about 3,000,000 are preferred for use in fracture or face plugging while gels having a higher molecular weight are preferred for permeability reduction applications. The following examples are provided to illustrate the present invention and are not to be construed as limiting the scope of the invention.

EXAMPLE I

A liquid gel solution is produced by adding 90% of stoichiometric chromic ions to an aqueous solution of 1,000 ppm undried PHPA dissolved in deionized water. The gel solution is diluted with produced water at a secondary oil recovery site in Crawford County, Ill. The dilute solution has a viscosity of 20 centipoise. This first solution is mixed with an equal volume of a second aqueous solution having the same viscosity and containing an undried, ungelled PHPA of higher average molecular weight than the PHPA used to form the gel of the first solution.

A micellar dispersion slug is injected into a formation via a well. The slug is 5% of the pore volume of the formation. The combined solution of gelled and ungelled PHPA described above is then injected into the reservoir to displace the micellar dispersion away from the injection wellbore. The PHPA solution satisfies both aspects of mobility control, pore plugging and fluid viscosity maintenance. The larger gel particles block a percentage of the pores in the formation forcing the micellar fluids through the unblocked pores while maintaining the desired viscosity of the displacement fluid. Oil displaced by the micellar dispersion and displacement fluid is recovered via production wells.

EXAMPLE II

Different polymer solutions are prepared from both undried PHPA made at Marathon Oil Company's research laboratory in Littleton, Colo. and from commercially available dried Dow PHPA. The undried PHPA has a molecular weight about equal to that of Dow 700 PHPA, i.e., between 3 and 5 million. Dow 1,000 has an average molecular weight around 6 million and Dow 500 has a molecular weight between 1 and 3 million. The Dow polymers are all dried PHPA which have been redissolved into solution. The polymer solutions described below have a polymer concentration of 5,000 ppm. The concentrations of chromate and sulfite are each 1,250 ppm. The order of adding cross-linking agent components to the polymer solutions is varied between experimental runs to determine the effect on produced gels. The empirical characteristics of each gel are recorded in the table below. The table indicates that adding the oxidizing agent to the solution prior to the reducing agent produces a more stable gel. The gels produced in this manner can then be injected into a formation according to the process described above.

TABLE 1

| Polymer | Conc. (ppm) | Order of Catalyst Addition | Gel Form and Time |
|---|---|---|---|
| Dow 500 | 5000 | $HSO_3^{-1}/Cr_2O_7^{-2}$ | None |
| Dow 700 | 5000 | $HSO_3^{-1}/Cr_2O_7^{-2}$ | None |
| Dow 1000 | 5000 | $HSO_3^{-1}/Cr_2O_7^{-2}$ | Soft gel |
| Dow 500 | 5000 | $Cr_2O_7^{-2}/HSO_3^{-1}$ | Firm (2–4 hrs) |
| Dow 500 | 5000 | $Cr^{+3}/HSO_3^{-1}$ | Firm (Almost Instantaneously) |
| Undried PHPA | 5000 | $HSO_3^{-1}/Cr_2O_7^{2}$ | Viscosity Increase - No Gel |
| Undried PHPA | 5000 | $Cr_2O_7^{-2}/HSO_3^{-1}$ | Firm (2–4 hrs) |

EXAMPLE III

Differing concentrations of a dried PHPA, commercial Dowell PHPA (J-333) having a molecular weight of about 5,000,000, are dissolved in fresh water. Sodium bisulfite and sodium dichromate are added to the PHPA solution in a sodium bisulfite:sodium dichromate:PHPA ratio of 4:1:1 to form gels. FIG. 1 shows the screen factors of the gels as a function of PHPA concentration.

EXAMPLE IV

Figure 2:
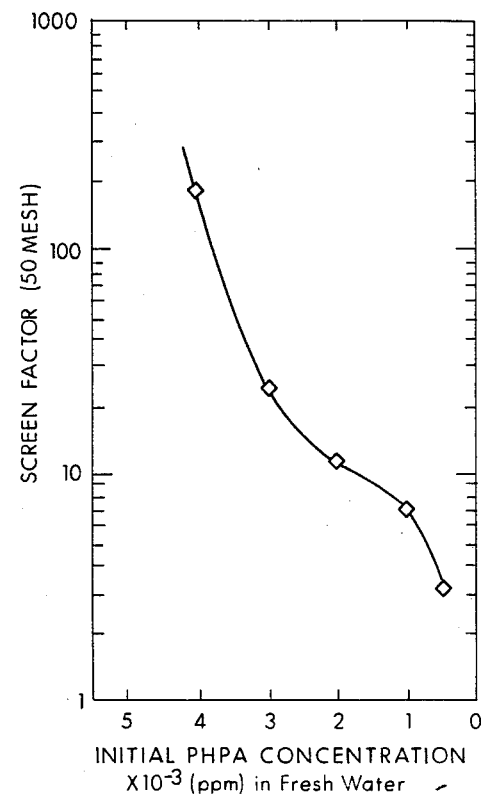
FIG. 2 displays an analogous relationship where an undried PHPA is used in the gel system. The screen factor is sensitive to changes in molecular weight and structure of the PHPA and as such predicts the effectiveness of the gels for mobility control.

An undried polymer of comparable molecular weight and degree of hydrolysis as the Dowell polymer of Example III is mixed with the fresh water of Example III in the same relative amounts. The results are shown in FIG. 2. Comparing FIGS. 1 and 2, it is apparent that the gels produced from dried PHPA have very low screen factors at low PHPA concentrations, while gels produced from undried PHPA have much higher screen factors at the lower concentrations due to apparent "salting out" of the dried PHPA from solution. The undried PHPA unexpectedly produces more effective gels for mobility control at low concentrations than the dried polymer.

While the foregoing preferred embodiment of the invention has been described and shown, it is understood that other alternatives and modifications, such as though suggested and others may be made thereto and follow in the scope of the invention.

What is claimed is:

1. A process for recovering hydrocarbons from a subterranean hydrocarbon-bearing formation comprising: cross-linking a water-soluble undried partially hydrolyzed polyacrylamide in an aqueous solution with a cross-linking agent to produce a cross-linked polyacrylamide gel; and injecting the gel into the formation via a well and thereafter recovering hydrocarbons from the formation.

2. The process of claim 1 wherein the cross-linking agent contains a fully reduced polyvalent metal cation.

3. The process of claim 2 wherein the cross-linking agent is chromic nitrate.

4. The process of claim 1 wherein the cross-linking agent is a redox system.

5. The process of claim 4 wherein the oxidizing agent of the redox system is an alkali metal dichromate or ammonium dichromate.

6. The process of claim 4 wherein the reducing agent of the redox system contains an alkali metal or ammonium and a sulfur-containing group.

7. The process of claim 6 wherein the sulfur-containing group is sulfite or bisulfite.

8. The process of claim 1 further comprising diluting the gel with a dilution water prior to injecting the gel into the formation.

9. The process of claim 8 wherein the dilution water contains an undried ungelled partially hydrolyzed polyacrylamide.

10. The process of claim 1 further comprising suspending the gel in solid particulate form in an aqueous medium.

11. The process of claim 1 wherein the gel reduces the permeability of at least a portion of the formation in which the gel is injected.

12. The process of claim 1 further comprising injecting a micellar dispersion into the formation before and/or after injecting the gel into the formation.

* * * * *